March 15, 1955  F. W. SCHMIDT, JR  2,704,352
TUNING DEVICE
Filed June 20, 1951
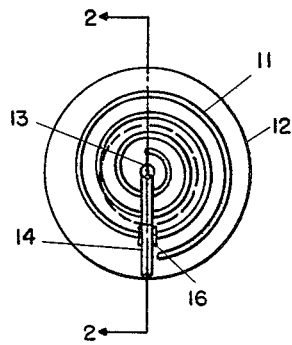
Fig. 1
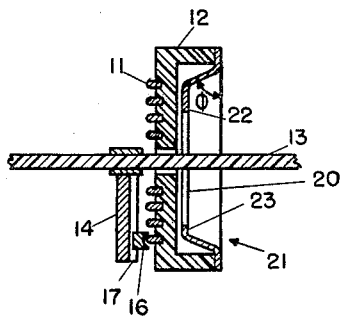 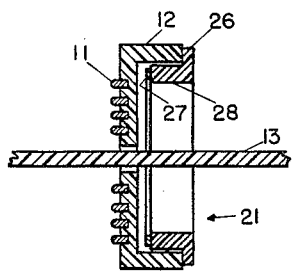
Fig. 2  Fig. 3
INVENTOR.
FRED W. SCHMIDT, JR.
BY
Darby & Darby
ATTORNEYS

United States Patent Office 2,704,352
Patented Mar. 15, 1955

2,704,352
TUNING DEVICE

Fred W. Schmidt, Jr., Cedar Grove, N. J., assignor to Allen B. Du Mont Laboratories, Inc., Clifton, N. J., a corporation of Delaware Application June 20, 1951, Serial No. 232,534

8 Claims. (Cl. 336—30)

This invention relates to a tracking means particularly adapted for use with a spirally-shaped tuning coil.

Objects of the invention are to provide a tracking device for spirally-shaped tuning coils which is reliable, economical, and stable with respect to temperature changes. Other objects will be apparent.

In the drawings—

Figure 1 is a front elevational view of the invention applied to a spirally-shaped tuning coil;

Figure 2 is a cross-sectional view through 2—2 of Figure 1; and

Figure 3 is a cross-sectional view of an alternative embodiment of the invention.

It is frequently desired to affect in a controlled manner the tracking or rate of change of the tuning of a coil, such as of turning coils in radio devices. Tracking of a spiral coil may be achieved by placing a suitably shaped metallic disc or washer parallel to and adjacent a portion of the surface thereof. The disc or washer is preferably made of a non-ferrous material, and therefore will decrease the inductance of said coil in the vicinity of this tracking device.

Referring to Figures 1 and 2 of the drawing, a spirally-shaped tuning coil 11 is attached to an insulative support member 12. A tuning shaft 13 extends axially through the center of the coil 11 and support member 12 and has attached thereto a radial slide support arm 14 and a contact 16 slidably mounted thereon. The radial arm 14 may be provided with a guide member 17 to permit radial movement of the slider 16 on the angularly rototable arm 14 whereby the slider can be made to follow the spiral contour of the coil 11 and make electrical contact therewith.

A tracking member 21, preferably of a non-ferrous material as mentioned, and having a frusto-conical shape, is attached to the support member 12 at an outer extremity thereof. The tracking member 21 has formed integrally therewith a planar portion 20 of annular configuration positioned parallel to and adjacent the plane defined by the spiral coil 11. As shown, the planar portion 20 is wider at one point 22 than at another point 23 on its rim.

When positioned as shown, the tracking device 21 causes a lower rate of change of inductance of the coil 11 when the slider 16 is at the outer portion thereof than would occur without the presence of said tracking device 21. By making the rim of different widths, as shown at 22 and 23, the rate of tuning of the coil 11 can be varied in a desired manner as the slider 16 rotates thereon.

The unique shape of the tracking device 21 achieves temperature compensation. The material of which the tracking device 21 is made is chosen to have a temperature coefficient of expansion of such a value with respect to that of the support member 12, that tracking will be stabilized over a wide range of temperatures. The angle $\phi$ of the frusto-conical portion of the tracking device may be varied as necessary under the condition of use to achieve the desired magnitude of temperature compensation. As the support member 12 expands outwardly, the tracking device 21 expands inwardly, thus maintaining desired substantially fixed spacing between the planar portion 20 and the spiral coil 11.

In the alternative embodiment of Figure 3, the tracking device 21 is shown as comprising an annular supporting member having an annular shoulder 26 in juxtaposition to a rear surface of the coil support member 12. An annular tracking member 27, preferably of a non-ferrous material, is attached to a projecting portion 28 which extends inwardly from the annular shoulder 26. The annular support member comprising the annular shoulder 26 and inwardly projecting portion 28 may be made of insulative material similar to that of which the coil support member 12 is made. Coefficients of expansion are chosen so that the annular tracking member 27 is maintained at a substantially fixed distance from the plane of the spiral coil 11.

While preferred embodiments of the invention have been described, other embodiments may be apparent to one skilled in the art. The scope of invention is defined by the following claims.

What is claimed is:

1. A tuning device comprising a spirally-shaped tuning coil, an adjustable electrical connection on said coil, means for moving said connection on said coil, and a planar conductive tracking member lying in a plane parallel to the plane of said spirally-shaped coil and adjacent a portion of said coil and substantially fixedly positioned within the electric field of said coil, whereby the rate of change of inductance of said coil is affected by said tracking member when said connection is moved on said coil.

2. A tuning device comprising an insulative support having a front planar surface, a spirally-shaped coil mounted on said surface, a planar conductive tracking member, and a tracking support member attached to said insulative support and supporting said tracking member in a plane parallel to the plane of said planar surface and in substantially fixed position in the electric field of said coil.

3. A tuning device comprising an insulative support having a front planar surface, a spirally-shaped coil mounted on said surface, a rim extending rearwardly from said support, and a frusto-conical tracking member attached at the outer edge thereof to said rim and extending frontwardly toward said coil and having a conductive portion thereof in the electric field of said coil.

4. A tuning device comprising an insulative support having a front planar surface, a spirally-shaped coil mounted on said surface, a shoulder extending rearwardly from said support, a tracking support member attached to said shoulder and having a frontwardly extending portion and a tracking conductive member attached thereto in substantially fixed position in the electric field of said coil.

5. The apparatus of claim 4 in which said tracking support member is of insulation material.

6. The apparatus of claim 4 in which said tracking conductive member is annular.

7. An electrical tuning device comprising an electrical coil having two ends and comprising a plurality of turns, an adjustable contact member, means for moving said member from one to another of said turns, and an electrically conductive tracking member positioned adjacent some of said turns intermediate the ends of said coil and in the electric field thereof, whereby the rate of change of inductance of said coil is affected by said tracking member when said connection is moved along said turns.

8. An electrical tuning device comprising an inductance member having two ends, means for changing the electrical length of said inductance member, and an electrically conductive tracking member positioned adjacent a portion of said inductance member intermediate the ends thereof and in the electric field thereof, whereby the rate of change of inductance of said inductance member is affected by said tracking member when said electrical length is changed.

References Cited in the file of this patent

UNITED STATES PATENTS

| | | |
|---|---|---|
| 2,115,826 | Norton et al. | May 3, 1938 |
| 2,318,361 | Bischoff | May 4, 1943 |
| 2,480,340 | Rose | Aug. 30, 1949 |
| 2,598,467 | Van Yzeren | May 27, 1952 |

FOREIGN PATENTS

| | | |
|---|---|---|
| 29,316 | Denmark | Feb. 13, 1922 |

OTHER REFERENCES

Publication, "Printed Circuit Techniques," National Bureau of Standards Circular 468, Nov. 15, 1947, pages 17, 18.